(12) United States Patent
Koizumi et al.

(10) Patent No.: US 7,470,891 B2
(45) Date of Patent: Dec. 30, 2008

(54) OPTICAL DEVICE

(75) Inventors: Naoyuki Koizumi, Nagano (JP);
Masahiro Sunohara, Nagano (JP);
Akinori Shiraishi, Nagano (JP); Yuichi Taguchi, Nagano (JP); Kei Murayama, Nagano (JP); Hideaki Sakaguchi, Nagano (JP); Mitsutoshi Higashi, Nagano (JP)

(73) Assignee: Shinko Electric Industries Co., Ltd., Nagano-shi (JP)

( * ) Notice: Subject to any disclaimer, the term of this patent is extended or adjusted under 35 U.S.C. 154(b) by 0 days.

(21) Appl. No.: 11/671,167

(22) Filed: Feb. 5, 2007

(65) Prior Publication Data
US 2007/0181778 A1    Aug. 9, 2007

(30) Foreign Application Priority Data
Feb. 7, 2006    (JP) .............................. 2006-030188

(51) Int. Cl.
G03B 21/00    (2006.01)
G02B 27/18    (2006.01)
G02B 26/00    (2006.01)

(52) U.S. Cl. ........................ 250/234; 359/212; 353/98

(58) Field of Classification Search ................ 250/234; 353/119, 38, 98, 99; 359/212–213; 257/82, 257/83, 437
See application file for complete search history.

(56) References Cited

U.S. PATENT DOCUMENTS

| 5,090,800 A | 2/1992 | Ushiro |
| 5,296,882 A | 3/1994 | Nelson et al. |
| 5,400,095 A | 3/1995 | Minich et al. |
| 5,642,927 A | 7/1997 | Booth et al. |
| 6,262,413 B1 * | 7/2001 | Taniguchi et al. ........... 250/216 |
| 6,871,982 B2 * | 3/2005 | Holman et al. .............. 362/331 |
| 2004/0012838 A1 * | 1/2004 | Huibers ...................... 359/291 |
| 2005/0024727 A1 * | 2/2005 | Ukuda ........................ 359/507 |

FOREIGN PATENT DOCUMENTS

| EP | 1347653 | 9/2003 |
| GB | 1524444 | 9/1978 |
| GB | 2413398 | 10/2005 |
| JP | 2004-117931 | 4/2004 |

* cited by examiner

*Primary Examiner*—John R Lee
(74) *Attorney, Agent, or Firm*—Rankin, Hill & Clark LLP

(57) ABSTRACT

The optical device 10 includes a light source 13, a mirror element 12 including a mirror 36 for reflecting light emitted from the light source 13 in a predetermined direction, and a mirror element housing body 11 that accommodates the mirror element 12 as well as seals a space D where the mirror element 12 is accommodated, characterized in that the light source 13 is provided inside the mirror element housing body 11.

8 Claims, 10 Drawing Sheets

OPTICAL DEVICE

BACKGROUND OF THE INVENTION

The present invention relates to an optical device and in particular to an optical device applied to a projector, an optical switch, a bar code or a copier.

The projector, optical switch, bar code and copier are equipped with an optical device shown in FIG. 1.

FIG. 1 shows a related art optical device.

Referring to FIG. 1, an optical device 100 comprises a light source 101, a reflector 102, a mirror element housing body 103, a mirror element 104, and a projection lens 105.

The light source 101 is provided in a position apart from the mirror element 104, element housing body 103, and projection lens 105. The light source 101 is used to emit light toward the mirror element 104. The light source 101 may be a halogen lamp. The reflector 102 is arranged so as to surround the light source 101. The reflector 102 is used to reflect the light emitted from the light source 101 toward the mirror element 104.

The mirror element housing body 103 includes a substrate 106 and a cover 107. The substrate 106 includes a wiring pattern (not shown) electrically connected to the mirror element 104. The cover 107 is arranged so as to surround the mirror element 104 arranged on the substrate 106. The cover 107 is formed by a translucent material.

The mirror element 104 is electrically connected to a wiring pattern (not shown) provided on the substrate 106.

The mirror element 104 includes a plurality of mirrors 109 arranged in a lattice shape. The plurality of mirrors 109 are provided on the upper face of the mirror element 104. Each of the plurality of mirrors 109 is designed to change its angle independently of the other mirrors 109. Each of the plurality of mirrors 109 changes its angle to switch between the ON and OFF states. The ON state refers to a state where light from the light source 101 is reflected onto the projection lens 105. The OFF state refers to a state where light from the light source 101 is not reflected onto the projection lens 105.

The projection lens 105 is arranged apart from the light source 101, reflector 102, mirror element housing body 103 and mirror element 104. The projection lens 105 is used to expansively project the light reflected by the mirrors 109 (for example, refer to Patent Reference 1).

To display a color image, a color filter (not shown) is separately provided between the light source 101 and the mirror element 104.

[Patent Reference 1] JP-A-2004-117931

With the related art optical device 100, the light source 101 and the reflector 102 are arranged apart from the mirror element housing body 103 and the mirror element 104 as independent components. This results in an increase in the size of the optical device 100, thus making it difficult to downsize the optical device 100.

SUMMARY OF THE INVENTION

An object of the invention is to provide an optical device that can be downsized.

According to one aspect of the invention, an optical device is provided comprising: a light source; a mirror element including a mirror for reflecting light emitted from the light source; and a mirror element housing body that accommodates the mirror element and seals a space where the mirror element is accommodated; characterized in that the light source is provided inside the mirror element housing body.

According to the invention, it is possible to downsize an optical device compared with a related art optical device where a light source is arranged in a position apart from a mirror element housing body by accommodating a mirror element as well as arranging a light source inside the mirror element housing body that seals the space where the mirror element is accommodated.

With the invention, it is possible to downsize an optical device.

DETAILED DESCRIPTION OF THE PREFERRED EMBODIMENTS

Embodiments of the invention will be described based on drawings.

First Embodiment

Figure 1:
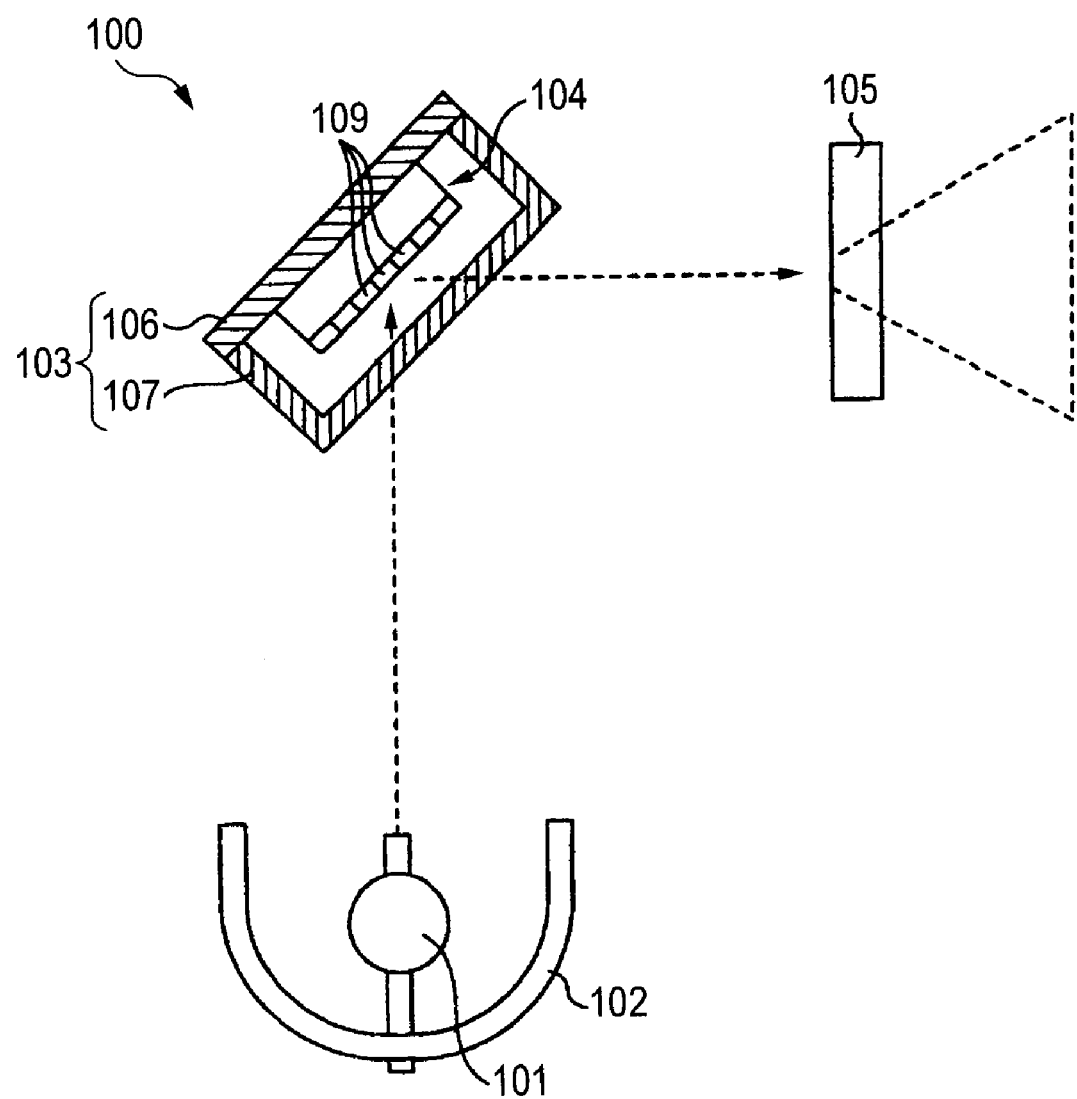
FIG. 1 shows a related art optical device.
Figure 2:
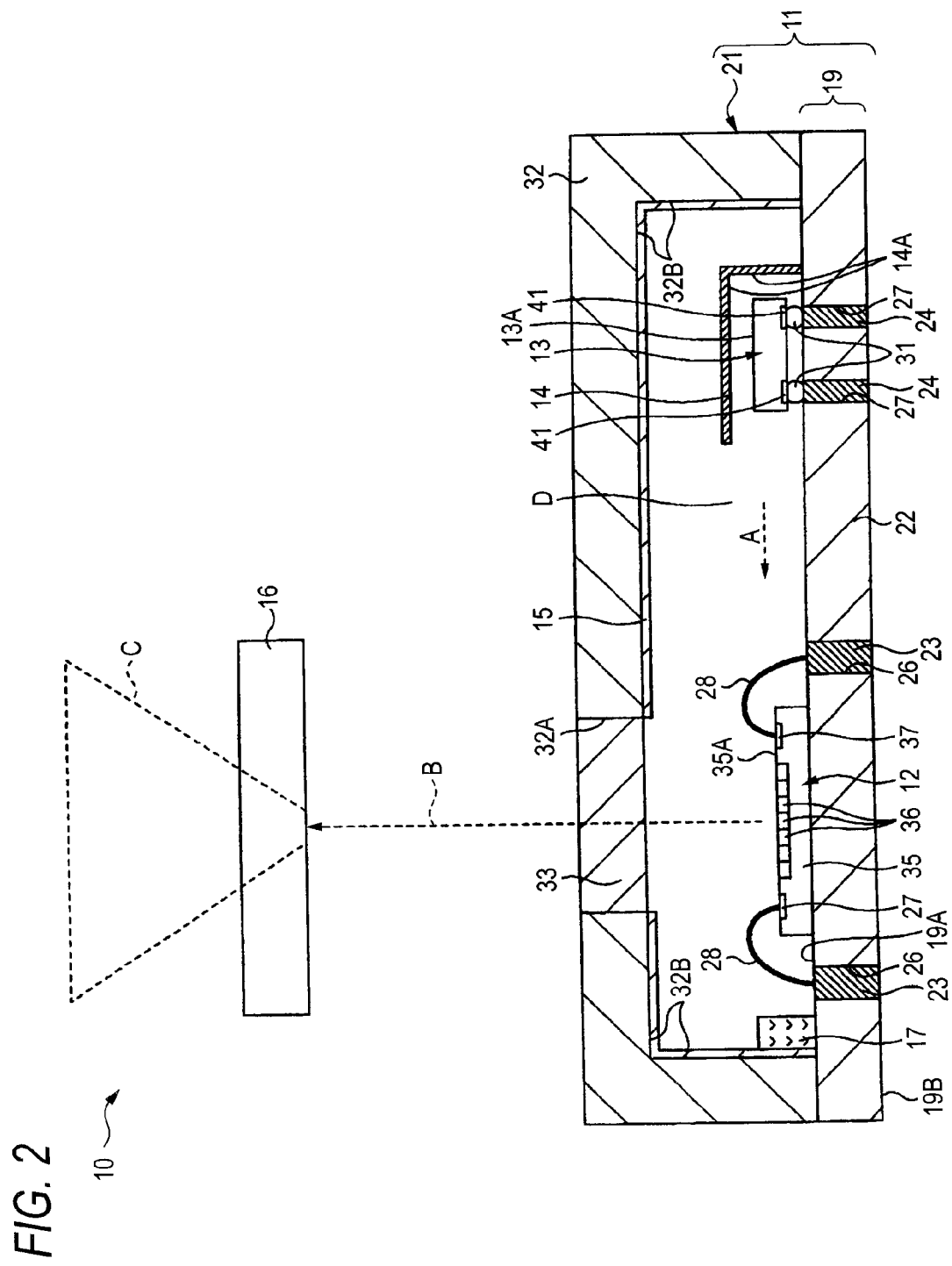
FIG. 2 is a cross-sectional view of an optical device according to the first embodiment of the invention.

FIG. 2 is a cross-sectional view of an optical device according to the first embodiment of the invention. A sign A in FIG. 2 shows light emitted from a light source 13 and the travel direction of the light from the light source 13 reflected by a reflecting member 14, B the travel direction of the luminous flux from a mirror element 12 reflected by a mirror 36, and C the light expansively projected as it passes through a projection lens 16.

Referring to FIG. 2, the optical device 10 according to the first embodiment comprises a mirror element housing body 11, a mirror element 12, a light source 13, a reflecting member 14, a reflection preventing film 15, a projection lens 16, and an absorbent 17.

The mirror element housing body 11 is used to accommodate the mirror element 12 as well as seal a space D here the mirror element 12 is accommodated. The mirror element housing body 11 includes a substrate 19 and a cover 21. The substrate 19 includes a substrate main body 22 and through vias 23, 24.

The substrate main body 22 has the shape of a plate and includes through holes 26, 27. The through hole 26 is formed so that it will penetrate the substrate main body 22 positioned in close proximity to an area where the mirror element 12 is arranged. The through hole 27 is formed so that it will penetrate the substrate main body 22 corresponding to an area where the light source 13 is arranged. As a material for the substrate main body 22, silicone, ceramic, or an Fe—Ni—Co alloy may be used. In case silicon or an Fe—Ni—Co alloy is used as a material for the substrate main body 22, an insulating film is provided on the surface of the substrate main body 22 including the surface part of the substrate main body 22 where the through holes 26, 27 are formed in order to secure insulation from the vias 23, 24.

The through via 23 is formed on the internal surface of the through hole 26. The upper end of the through via 23 is electrically connected, or connected by way of wire bonding, to the mirror element 12 via a wire 28. The lower end of the through via 23 functions as an external connection terminal.

The through via 24 is formed on the internal surface of the through hole 27. The upper end of the through via 24 is electrically connected to the light source 13 via a bump 31. The lower end of the through via 24 functions as an external connection terminal. A material for the through vias 23, 24 may be a conductive metal.

The cover 21 includes a cover main body 32 and a window 33 for transmission of light. The cover main body 32 is provided on a substrate 19. In the cover main body 32 opposed to the mirror element 12 is formed a through-hole part 32A. The through-hole part 32A has a shape that exposes a plurality of mirrors 36 provided on the mirror element 12. A material for the cover main body 32 may be a resin, glass, or a metal. A particular type of resin may be an epoxy resin or an acrylic resin. As a particular metal type, an iron alloy or a nickel alloy may be used.

The window 33 for transmission of light is provided at the through-hole part 32A of the cover main body 32. The window 33 for transmission of light is used to emit light reflected by the mirrors 36 to outside the mirror element housing body 11. A material for the window 33 for transmission of light may be a material with a feature to transmit light. As a material for the window 33, glass may be used.

Figure 3:
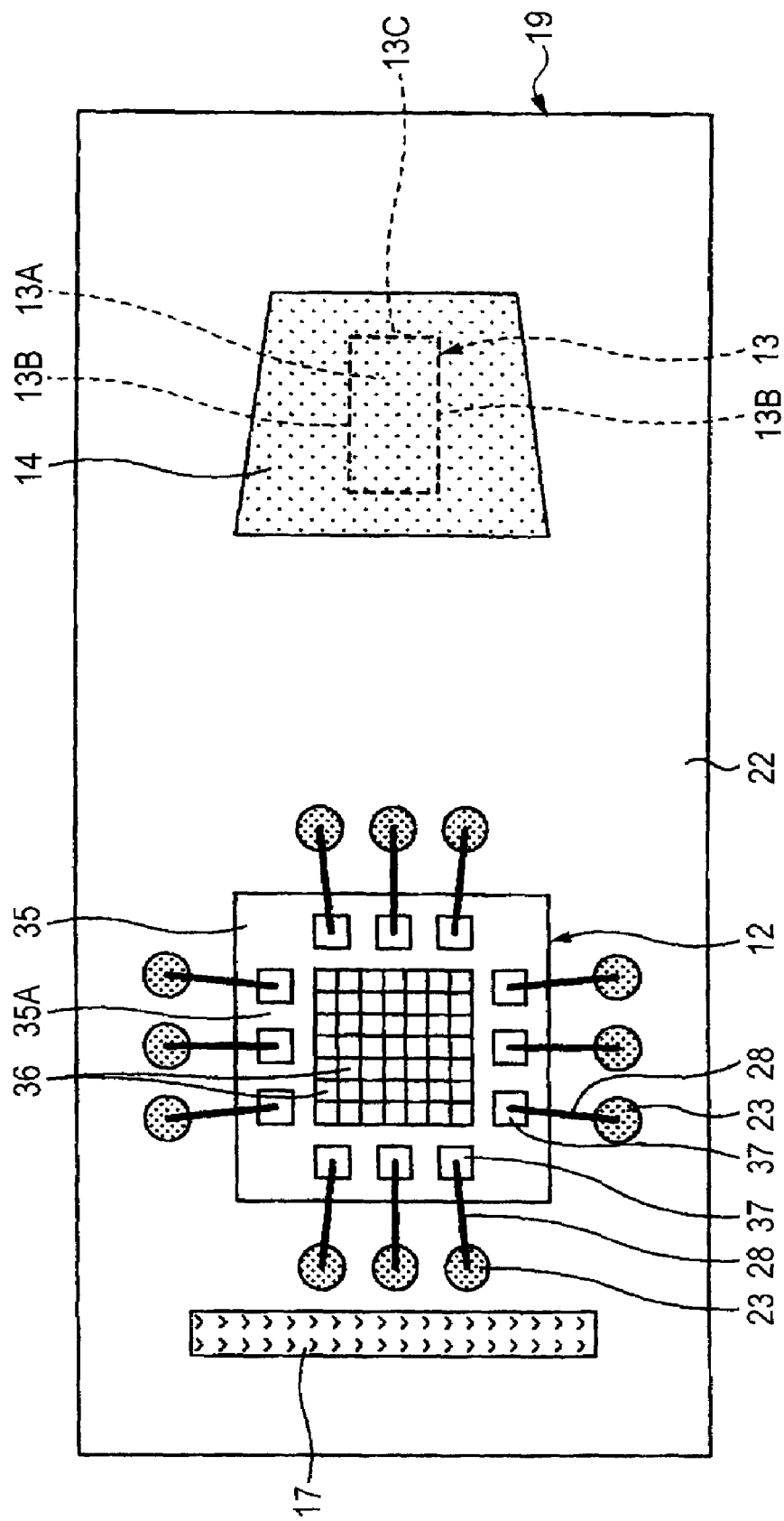
FIG. 3 is a plan view of a mirror element, a light source, a reflecting member, and an absorbent provided on a substrate.

FIG. 3 is a plan view of a mirror element, a light source, a reflecting member, and an absorbent provided on a substrate.

Next, the mirror element 12, the light source 13 and the reflecting member 14 will be described in this order referring to FIGS. 2 and 3.

The mirror member 12 is provided on a substrate 19 exposed to the space D (inside the mirror element housing body 11). The mirror element 12 includes a mirror element main body 35, a plurality of mirrors 36, and an electrode pad 37. The mirror element main body 35 is fixed on the substrate main body 22 surrounded by the through via 23.

The plurality of mirrors 36 are provided on the upper face 35A of the mirror element main body 35. The plurality of mirrors 36 are arranged in the shape of a lattice. Each of the plurality of mirrors 36 is designed to independently change its angle. Each of the plurality of mirrors 36 changes its angle to switch between the ON and OFF states. The ON state refers to a state where light from the light source 13 is reflected onto the projection lens 16. The OFF state refers to a state where light from the light source 13 is not reflected onto the projection lens 16.

The electrode pad 37 is provided on the upper face 35A of the mirror element main body 35 and is electrically connected to the mirror element main body 35. The electrode pad 37 is electrically connected to the through via 23 via a wire 28.

As the mirror element 12, for example, a DMD (Digital Micromirror Device: registered trademark of TEXAS INSTRUMENTS). The DMD includes a plurality of mirrors 36 and a memory element (not shown) on the mirror element main body 35. The memory element (not shown) is used to change the angle of each of the mirrors 36. In case an element without a memory element is used as the mirror element 12, electromagnets (not shown) are provided around the mirror element 12 to change the angle of each of the mirrors 36.

The light source 13 is provided on the substrate 19 exposed to the space D (inside the mirror element housing body 11). The light source 13 includes an electrode pad 41 that comes in contact with a bump 31. The light source 13 is electrically connected to the through via 24 via the bump 31.

In this way, by arranging the light source 13 inside the mirror element housing body 11 that accommodates the mirror element 12 and seals a space D where the mirror element 12 is accommodated, it is possible to downsize the optical device 10 compared with the related art optical device 100 where the light source 101 is arranged in a position apart from the mirror element housing body 103.

The light source 13 is provided inside the mirror element housing body 11 so that there is no need to provide a support member to support the light source 13. This reduces the costs for the optical device 10.

As the light source 13, a light-emitting element may be used. As a light-emitting element, a light-emitting diode or a laser diode may be used. Such a light-emitting element is extremely compact when compared with a halogen lamp used as the light source 101 of the related art optical device 100 and still has the same luminance as that of a halogen lamp.

In this way, by using a light-emitting element as the light source 13, it is possible to arrange the light source 13 inside the mirror element housing body 11.

The reflecting member 14 is provided on the substrate main body 22 so as to surround the upper face 13A of the light source 13, the side faces 13B and the rear face 13C. The reflecting member 14 is mirror-finished. The reflecting member 14 reflects light emitted from the light source 13 on its inner surface 14A to efficiently guide the light emitted from the entire light source 13 to the mirror element 12. A material for the reflecting member 14 may be an iron alloy, a nickel alloy, or an aluminum alloy. As the reflecting member 14, a glass plate may be used with a coating of a reflective film of aluminum or the like.

Next, the reflection preventing film 15, the projection lens 16, and the absorbent 17 will be described in this order referring to FIG. 2.

The reflection preventing film 15 is provided to cover the face 32B of the cover main body 32 exposed to the space D. The reflection preventing film 15 is a film used to prevent light from being reflected. The reflection preventing film 15 may be a carbon-filled resin, that is, a resin filled with carbon particles.

The reflection preventing film 15 effective in case the face 32B of the cover main body 32 is not surface finished. In case a resin or glass is used as a material for the cover main body 32, a light-shielding film for shielding light is preferably provided between the reflection preventing film 15 and the cover main body 32. Chromium may be used for the light-shielding film.

In case a metal is used as a material for the cover main body 32 and the face 32B of the cover main body 32 is mirror-finished, the face 32B of the cover main body 32 functions as the reflecting member 14. This eliminates the need for the reflection preventing film 15 as well as the reflection member 14.

The projection lens 16 is separately provided upward from the window 33 for transmission of light. The projection lens 16 is used to expansively project a luminous flux reflected by the mirrors 36.

The absorbent 17 is provided on the substrate main body 22 exposed to the space D formed in the mirror element housing body 11 (inside the mirror element housing body 11). The absorbent 17 is used to absorb water and/or gas (such as $O_2$, CO, $CO_2$ or $N_2$) in the space D. As the absorbent 17, a Zr alloy called a getter may be used. A Zr alloy applicable as a getter may be a Zr—V—Fe—Ti alloy.

By providing such an absorbent 17 inside the mirror element housing body 11, it is possible to absorb water and/or gas (such as $O_2$, CO, $CO_2$ or $N_2$) in the space D and prevent the water and/or gas in the space D from adversely affecting the operation of the mirrors 36.

With the optical device according to this embodiment, by arranging the light source 13 inside the mirror element housing body 11 that accommodates the mirror element 12 and seals the space D where the mirror element 12 is accommodated, it is possible to downsize the optical device 10 compared with the related art optical device 100 where the light source 101 is arranged in a position apart from the mirror element housing body 103.

The light source 13 is provided inside the mirror element housing body 11 so that there is no need to provide a support member to support the light source 13. This reduces the costs for the optical device 10.

Second Embodiment

Figure 4:
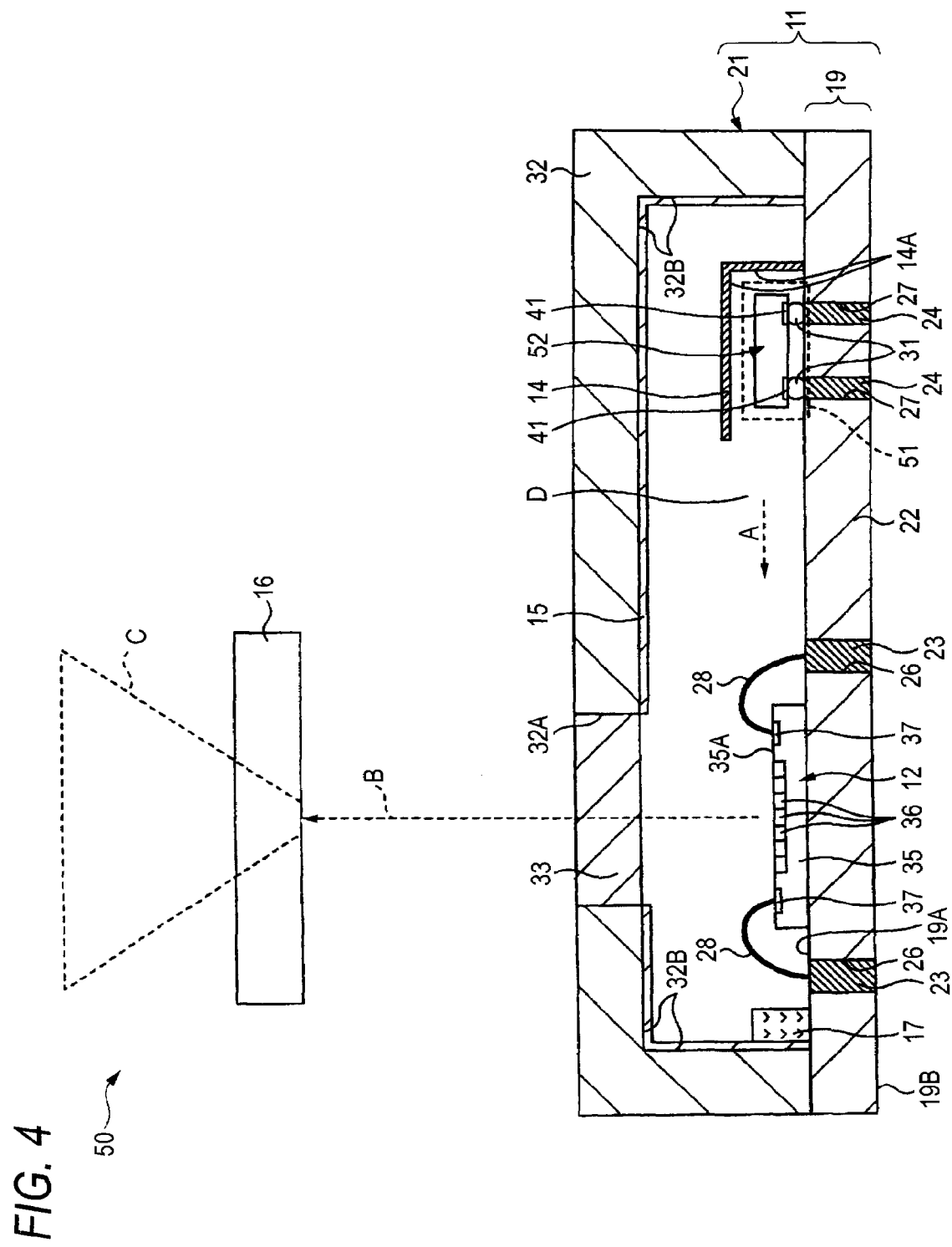
FIG. 4 is a cross-sectional view of an optical device according to the second embodiment of the invention.
Figure 5:
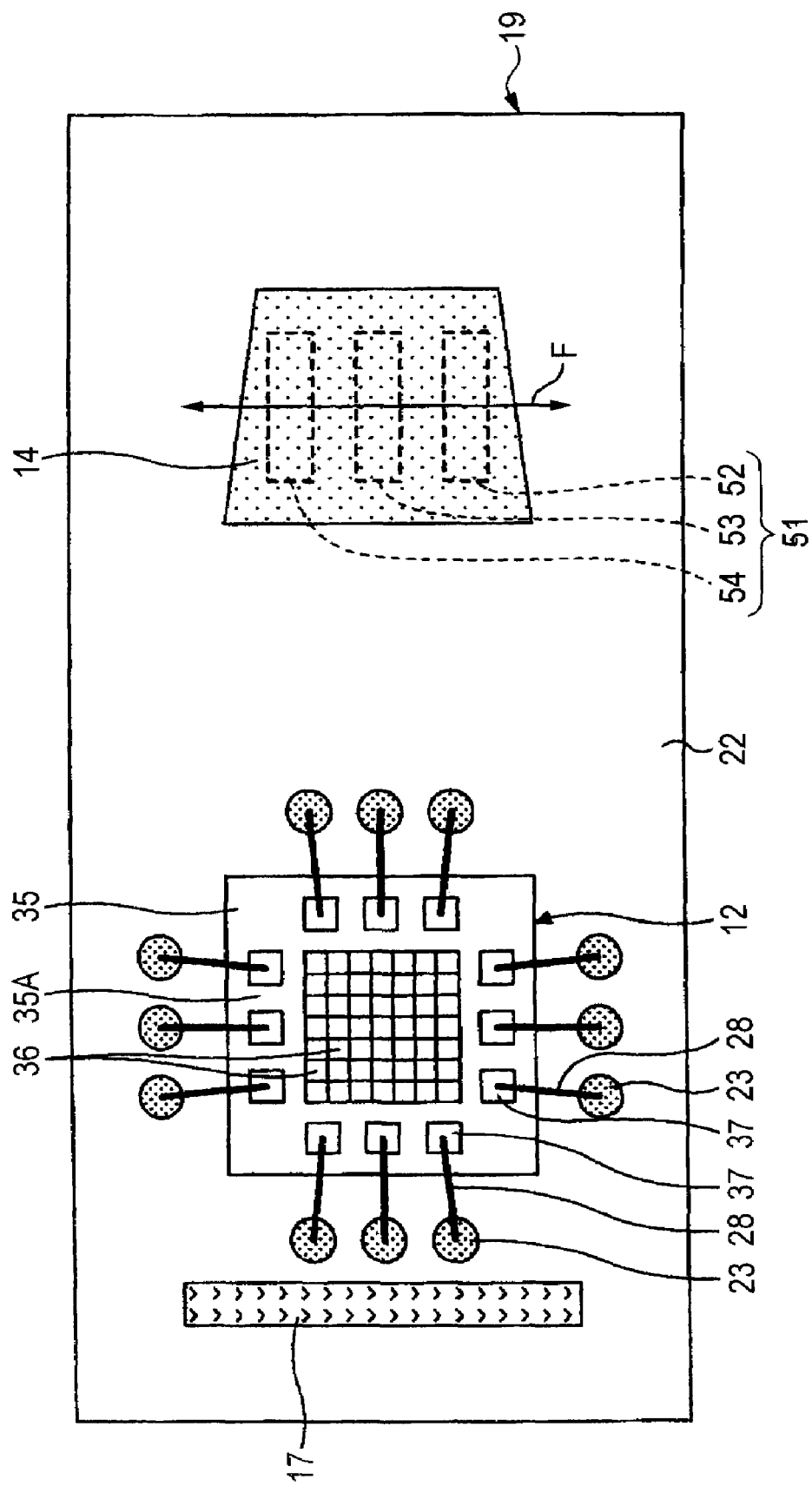
FIG. 5 is a plan view of a mirror element, a light source, a reflecting member, and an absorbent provided on a substrate.

FIG. 4 is a cross-sectional view of an optical device according to the second embodiment of the invention. FIG. 5 is a plan view of a mirror element, a light source, a reflecting member and an absorbent provided on a substrate. In FIG. 4, a same component as that of the optical device 10 according to the first embodiment is given the same sign. In FIG. 5, a same component as that of the optical device 50 shown in FIG. 4 is given the same sign. A sign F shown in FIG. 5 represents a direction in which the first to third light-emitting elements 52-54 are arranged (hereinafter referred to "Direction F").

Referring to FIGS. 4 and 5, the optical device 50 according to the second embodiment has the same configuration as the optical device 10 according to the first embodiment except in that a light source 51 is provided in place of the light source 13 provided on the optical device 10.

The light source 51 includes a first light-emitting element 52, a second light-emitting element 53, and a third light-emitting element 54. The first to third light-emitting elements 52-54 are disposed on the substrate main body 22 facing the reflecting member 14. The first to third light-emitting elements 52-54 are arranged in this order in Direction F. The first light-emitting element 52 is one that emits red light. The second light-emitting element 53 is one that emits blue light. The third light-emitting element 54 is one that emits green light. As the first to third light-emitting elements 52-54, a light-emitting diode or a laser diode may be used.

With the optical device according to this embodiment, the light source 51 includes the first light-emitting element 52 emitting red light, the second light-emitting element 53 emitting blue light, and the third light-emitting element 54 emitting green light. Thus it is possible to display a color image without using a color filter, which downsizes the optical device 50.

The color filter is not necessary so that it is possible to reduce the costs for the optical device 50.

While three light-emitting elements (the first to third light-emitting elements 52-54) are used as the light source 51 with the optical device 50 of this embodiment, the first to third light-emitting elements 52-54 may be arranged in Direction F on the substrate main body 22 facing the reflecting member 14 to configure a light source.

Third Embodiment

Figure 6:
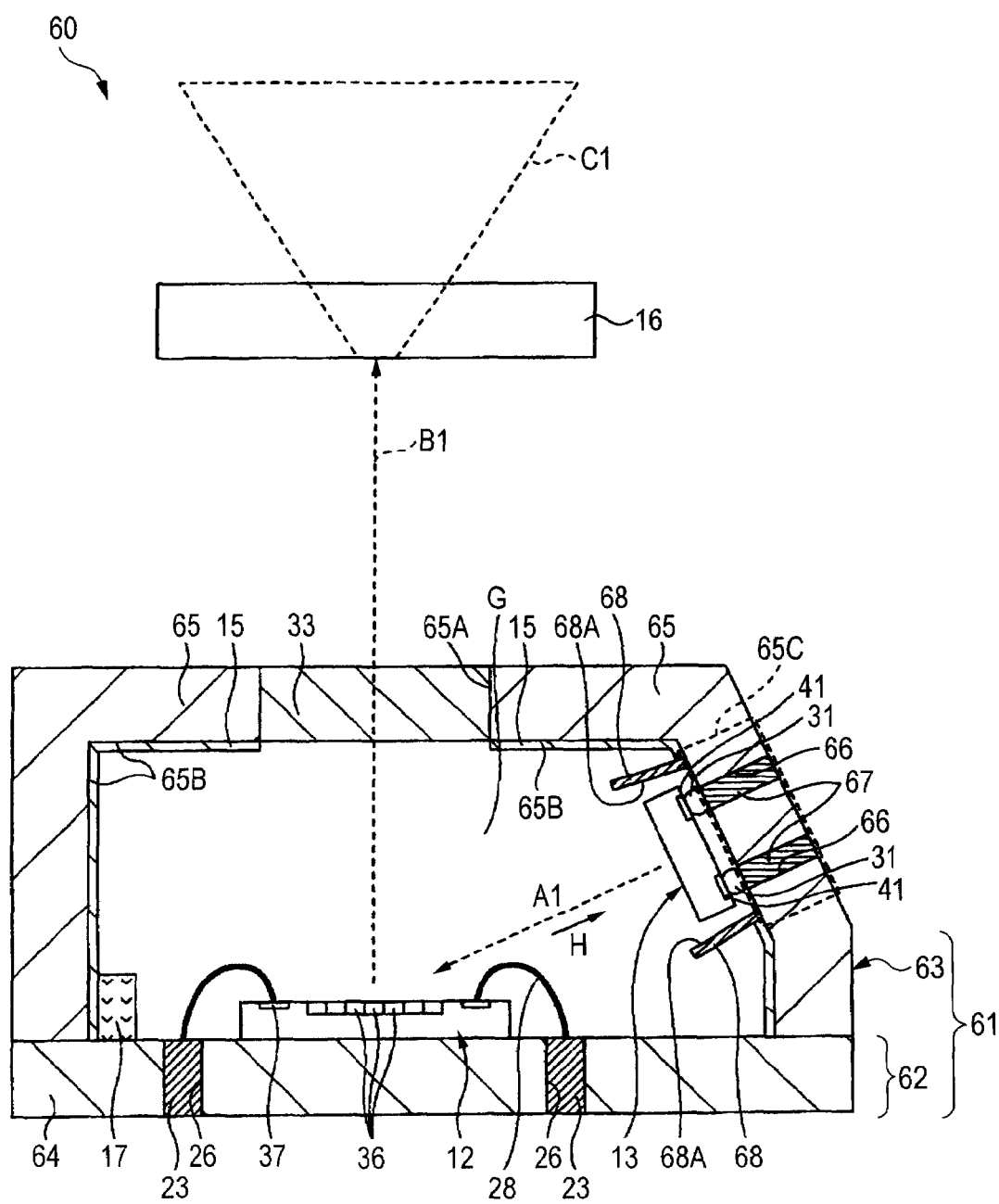
FIG. 6 is a cross-sectional view of an optical device according to the third embodiment of the invention.

FIG. 6 is a cross-sectional view of an optical device according to the third embodiment of the invention. In FIG. 6, a same component as that of the optical device 10 according to the first embodiment is given the same sign. A sign A1 shown in FIG. 6 represents the travel direction of the light emitted by the light source 13 and the light from the light source 13 reflected by the reflecting member 68, B1 the travel direction of the luminous flux reflected by the mirrors 36 of the mirror element 12, and C1 the light expansively projected as it passes through a projection lens 16.

Referring to FIG. 6, the optical device 60 according to the third embodiment comprises a mirror element housing body 61, a mirror element 12, a light source 13, a reflecting member 68, a reflection preventing film 15, a projection lens 16, and an absorbent 17.

The mirror element housing body 61 is used to accommodate the mirror element 12 as well as seal a space G where the mirror element 12 is accommodated. The mirror element housing body 61 includes a substrate 62 and a cover 63. The substrate 62 includes a substrate main body 64 and a through via 23.

The substrate main body 64 has the shape of a plate. The through hole 26 is formed so that it will penetrate the substrate main body 64 positioned in close proximity to an area where the mirror element 12 is arranged. As a material for the substrate main body 64, silicone, ceramic, or an Fe—Ni—Co alloy may be used.

The through via 23 is formed on the internal surface of the through hole 26. The upper end of the through via 23 is electrically connected, or connected by way of wire bonding, to the mirror element 12 provided on the substrate 62 via a wire 28. The lower end of the through via 23 functions as an external connection terminal.

The cover 63 includes a cover main body 65, a window 33 for transmission of light, and a through via 67. The cover main body 65 is provided on the substrate 62. The cover main body 65 includes a through-hole part 65A, an inclined part 65C, and a through hole 66. The through-hole part 65A is formed in the cover main body 65 facing the mirror element 12. The through-hole part 65A has a shape that exposes a plurality of mirrors 36 provided on the mirror element 12.

The inclined part 65C is part of the cover main body 65. The inclined part 65C has a light source 13 and a reflecting member 68 arranged thereon. The through hole 66 is formed to penetrate the inclined part 65C.

As a material for the cover main body 65, a resin, glass, or a metal may be used. A particular type of resin may be an epoxy resin or an acrylic resin. As a particular metal type, an iron alloy or a nickel alloy may be used. In case a metal is used as a material for the cover main body 65, an insulating film is provided on the surface of the cover main body 65 including the surface part of the cover main body 65 where the through hole 66 is formed in order to secure insulation from the via 67.

The window 33 for transmission of light is provided at the through-hole part 65A of the cover main body 65. The window 33 for transmission of light is used to emit light reflected by the mirrors 36 to outside the mirror element housing body 61.

The through via 67 is formed on the internal surface of the through hole 66. An end of the through via 67 (end positioned on the side of the space G) is electrically connected to the light source 13 via a bump 31. The other end of the through via 67 functions as an external connection terminal.

Figure 7:
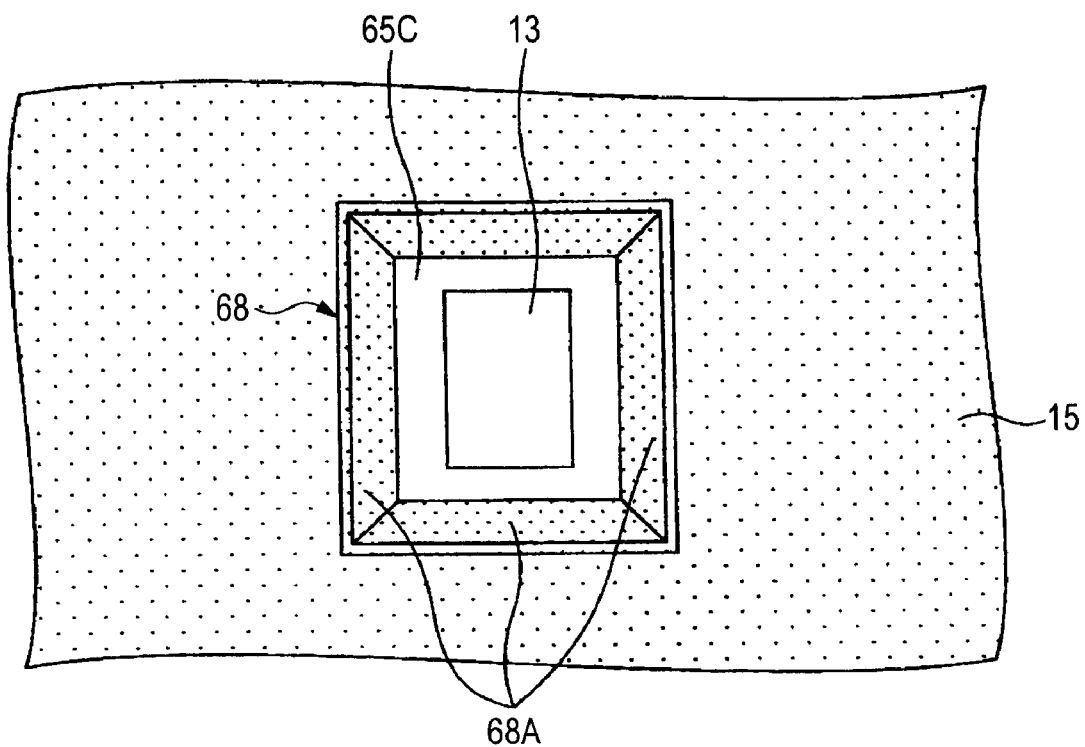
FIG. 7 is a view of the light source and the reflecting member of FIG. 6 in the direction of H.

FIG. 7 is a view of the light source and the reflecting member of FIG. 6 in the direction of H.

Next, the light source 13 and the reflecting member 68 will be described in this order referring to FIGS. 6 and 7.

The light source 13 is provided on the inclined part 65C of the cover main body 65 exposed to the space G. The light source 13 includes an electrode pad 41 that comes in contact with a bump 31. The light source 13 is electrically connected to the through via 67 via the bump 31.

In this way, by arranging the light source 13 on the inclined part 65C of the cover main body 65 exposed to the space G, it is possible to downsize the optical device 60 compared with the related art optical device 100 where the light source 101 is arranged in a position apart from the mirror element housing body 103.

The light source 13 is provided on the cover main body 65 so that it is possible to downsize the substrate 62. It is thus possible to further downsize the optical device 60 compared with the optical device 10 according to the first embodiment.

The light source 13 is provided on the cover main body 65 so that there is no need to provide a support member to support the light source 13. This reduces the costs for the optical device 60.

The reflecting member 68 is provided on the inclined part 65C so as to surround the light source 13. The reflecting member 68 is mirror-finished. The reflecting member 68 reflects light emitted from the light source 13 on its inner surface 68A to efficiently guide the light emitted from the entire light source 13 to the mirror element 12. A material for the reflecting member 68 may be a metal such as an iron alloy, a nickel alloy, or an aluminum alloy.

Next, the reflection preventing film 15, the projection lens 16, and the absorbent 17 will be described in this order referring to FIG. 6.

The reflection preventing film 15 is provided to cover the face 65B of the cover main body 65 exposed to the space G. The projection lens 16 is separately provided upward from the window 33 for transmission of light. The projection lens 16 is used to expansively project a luminous flux reflected by the mirrors 36. The absorbent 17 is provided on the substrate main body 64 exposed to the space G formed in the mirror element housing body 61. As a material for the reflection preventing film 15 or the absorbent 17, a material used in the first embodiment may be used.

With the optical device according to this embodiment, by arranging the light source 13 on the inclined part 65C of the cover main body 65 exposed to the space G, it is possible to downsize the optical device 60 compared with the related art optical device 100 where the light source 101 is arranged in a position apart from the mirror element housing body 103.

The light source 13 is provided on the cover main body 65 so that it is possible to downsize the substrate 62 in the face direction. It is thus possible to further downsize the optical device 60.

The light source 13 is provided on the cover main body 65 so that there is no need to provide a support member to support the light source 13. This reduces the costs for the optical device 60.

Fourth Embodiment

Figure 8:
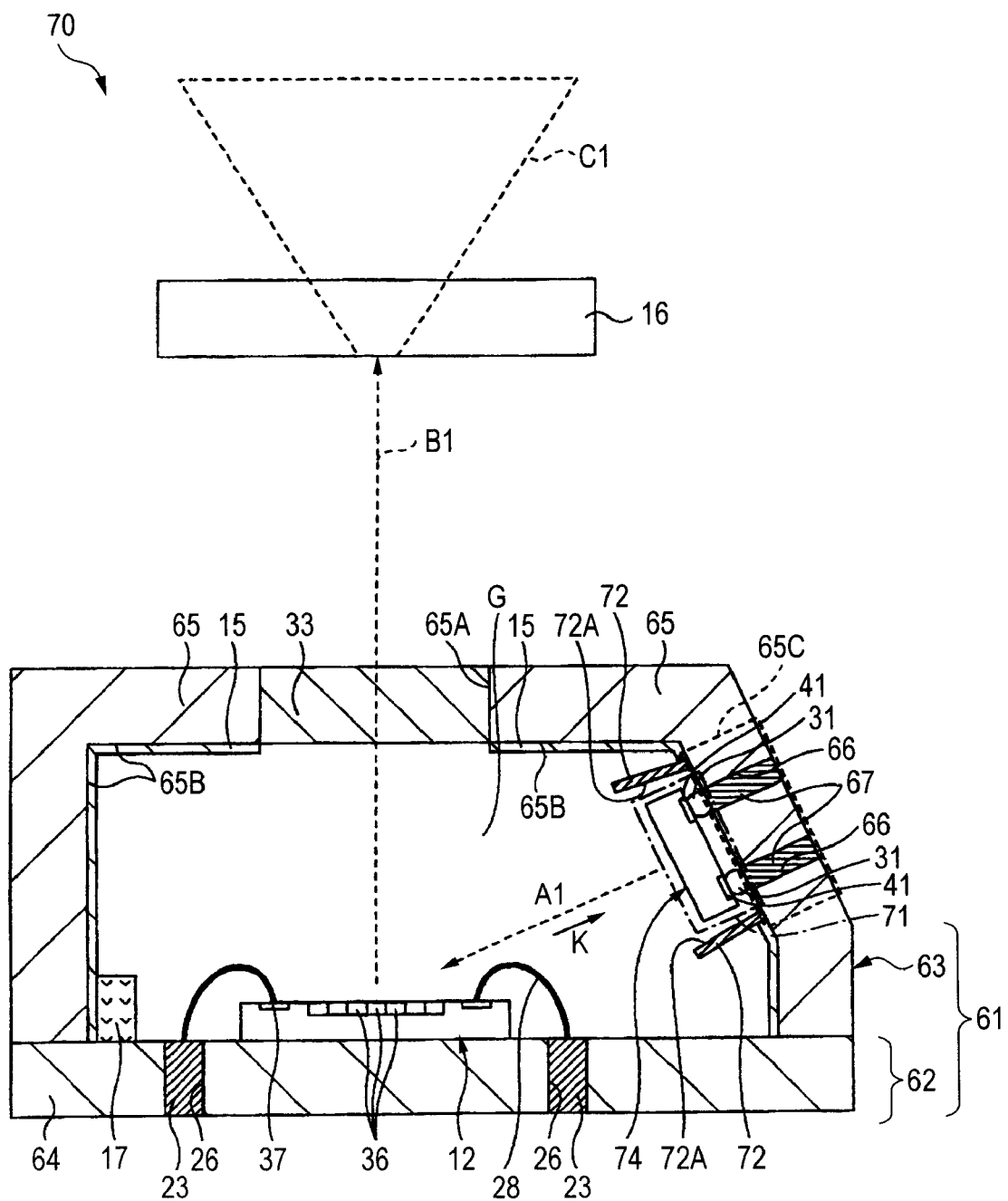
FIG. 8 is a cross-sectional view of an optical device according to the fourth embodiment of the invention.
Figure 9:
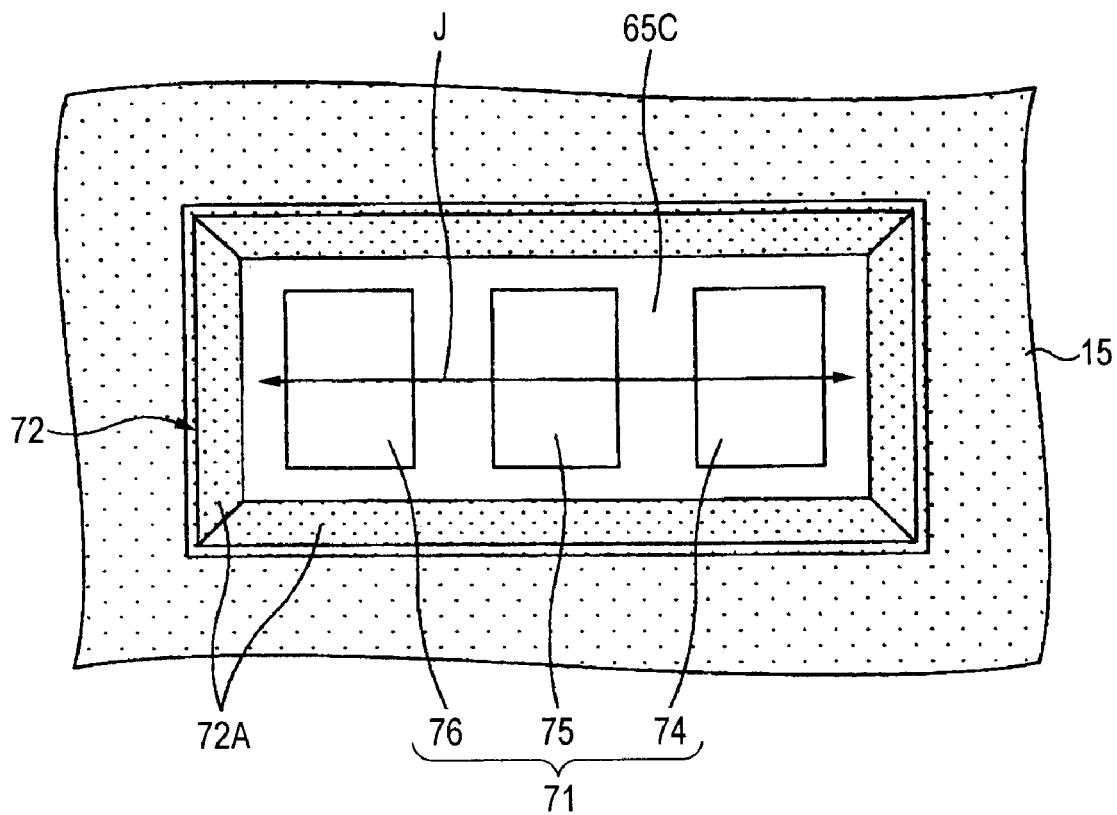
FIG. 9 is a view of the light source and the reflecting member of FIG. 8 in the direction of K.

FIG. 8 is a cross-sectional view of an optical device according to the fourth embodiment of the invention. FIG. 9 is a view of the light source and the reflecting member of FIG. 8 in the direction of K. In FIGS. 8 and 9, a same component as that of the optical device 60 according to the third embodiment is given the same sign. A sign J shown in FIG. 9 represents the direction in which the first to third light-emitting elements 74-76 are arranged (hereinafter referred to as "Direction J").

Referring to FIGS. 8 and 9, the optical device 70 according to the fourth embodiment has the same configuration as the optical device 60 according to the third embodiment except in that a light source 71 and a reflecting member 72 are provided in place of the light source 13 and the reflecting member 68 provided on the optical device 60.

The light source 71 includes a first light-emitting element 74, a second light-emitting element 75, and a third light-emitting element 76. The first to third light-emitting elements 74-76 are provided on the inclined part 65C exposed to the space G. The first to third light-emitting elements 74-76 are arranged in this order in Direction J. The first light-emitting element 74 is one that emits red light. The second light-emitting element 75 is one that emits blue light. The third light-emitting element 76 is one that emits green light. As the first to third light-emitting elements 74-76, a light-emitting diode or a laser diode may be used.

The reflecting member 72 is provided on the inclined part 65C so as to surround the light source 71. The reflecting member 72 is mirror-finished. The reflecting member 72 reflects light emitted from the light source 71 on its inner surface 72A to efficiently guide the light emitted from the entire light source 71 to the mirror element 12. A material for the reflecting member 72 may be a metal such as an iron alloy, a nickel alloy, or an aluminum alloy.

With the optical device according to this embodiment, the light source 71 includes the first light-emitting element 74 emitting red light, the second light-emitting element 75 emitting blue light, and the third light-emitting element 76 emitting green light. Thus it is possible to display a color image without using a color filter, which downsizes the optical device 70.

The color filter is not necessary so that it is possible to reduce the costs for the optical device 70.

While three light-emitting elements (the first to third light-emitting elements 74-76) are used as the light source 71 with the optical device 70 of this embodiment, the first to third light-emitting elements 74-76 may be arranged in Direction J on the inclined part 65C to configure a light source.

Fifth Embodiment

Figure 10:
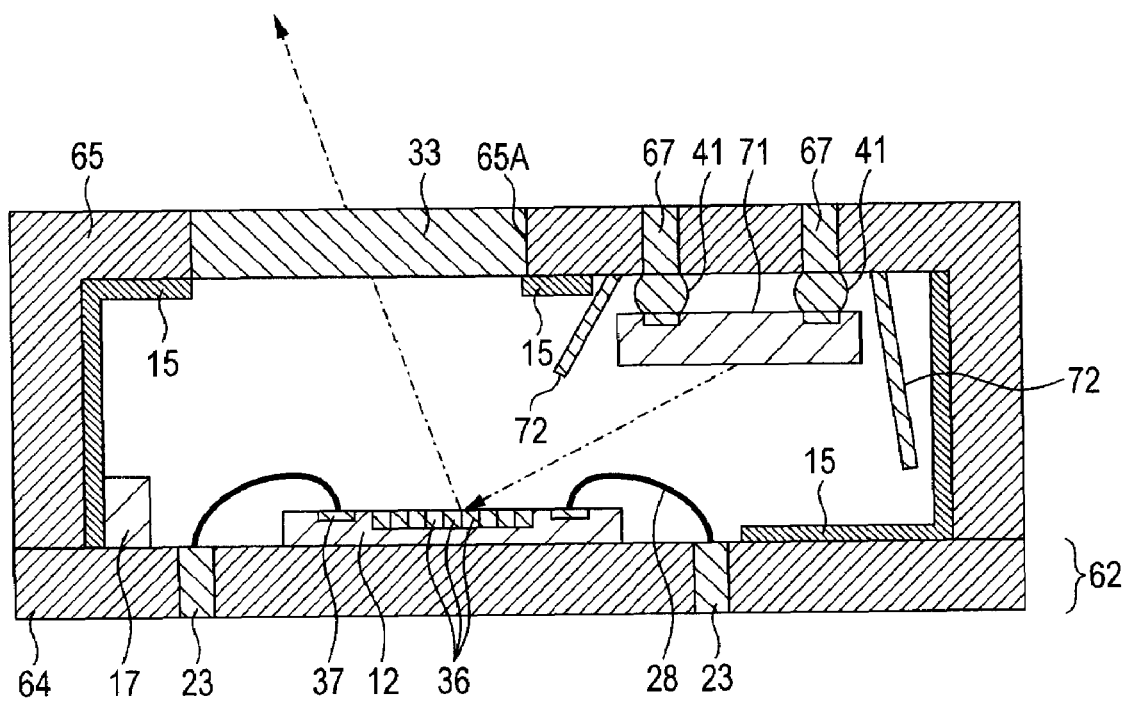
FIG. 10 is a cross-sectional view of an optical device according to the fifth embodiment of the invention.

FIG. 10 is a cross-sectional view of an optical device according to the fourth embodiment of the invention.

In FIG. 10, a same component as that of the optical device 70 according to the forth embodiment is given the same sign. As shown in FIG. 10, the light source 71 may be arranged above the mirror element 12 so that the light source 71 faces the mirror element 12.

While preferred embodiments of the invention are discussed in detail, the invention is not limited to those specific embodiments but various modifications and changes can be made to the invention without departing from the scope of the invention described in the claims.

This invention is applicable to an optical device that must satisfy a need for downsizing.

What is claimed is:

1. An optical device comprising:
   a light source;
   a mirror element including at least one mirror for selectively reflecting light emitted from the light source, the at least one mirror being movable between a reflecting position wherein the light emitted from the light source is reflected and a non-reflecting position wherein the light emitted from the light source is not reflected; and a mirror element housing body that accommodates the mirror element and seals a space where the mirror element is accommodated, wherein
the light source is provided inside the mirror element housing body.

2. The optical device according to claim 1, wherein the light source is one or a plurality of light-emitting elements.

3. The optical device according to claim 1, further comprising:
a reflecting member for reflecting light emitted by the light source toward the mirror provided inside the mirror element housing body.

4. The optical device according to claim 1, further comprising:
an absorbent for absorbing water and/or gas provided in the mirror element housing body.

5. The optical device according to claim 2, wherein
the plurality of light-emitting elements include a light-emitting element for emitting red light, a light-emitting element for emitting green light and a light-emitting element for emitting blue light.

6. The optical device according to claim 1, wherein
the light source is arranged above the mirror element so that the light source faces the mirror element.

7. The optical device according to claim 1, wherein
the mirror element comprises a plurality of mirrors arranged in a shape of a lattice.

8. The optical device according to claim 7, wherein said plurality of mirrors comprises independently movable mirrors.

* * * * *